US006981523B2

(12) United States Patent
Seguin

(10) Patent No.: US 6,981,523 B2
(45) Date of Patent: *Jan. 3, 2006

(54) VARIABLE VOLUME RESERVOIR

(75) Inventor: Carl Seguin, Laval (CA)

(73) Assignee: Sobacor, Laval (CA)

(*) Notice: Subject to any disclaimer, the term of this patent is extended or adjusted under 35 U.S.C. 154(b) by 0 days.

This patent is subject to a terminal disclaimer.

(21) Appl. No.: 10/869,385

(22) Filed: Jun. 16, 2004

(65) Prior Publication Data

US 2005/0011565 A1 Jan. 20, 2005

Related U.S. Application Data

(63) Continuation-in-part of application No. 10/053,661, filed on Jan. 24, 2002, now Pat. No. 6,772,794.

(51) Int. Cl.
*F16L 55/04* (2006.01)

(52) U.S. Cl. .......................... 138/30; 138/31; 220/721

(58) Field of Classification Search .................. 138/30, 138/31, 26; 220/721, 720, 723
See application file for complete search history.

(56) References Cited

U.S. PATENT DOCUMENTS

| | | | | | |
|---|---|---|---|---|---|
| 1,830,869 | A | * | 11/1931 | Maurice | 138/30 |
| 1,932,666 | A | * | 10/1933 | Hyatt | 138/30 |
| 1,950,107 | A | * | 3/1934 | Guinn et al. | 138/30 |
| 2,809,665 | A | * | 10/1957 | Crowe | 138/30 |
| 3,075,558 | A | * | 1/1963 | Von Forell | 138/30 |
| 3,099,189 | A | * | 7/1963 | Edgard | 92/23 |
| 3,556,095 | A | * | 1/1971 | Ismach | 128/204.28 |
| 3,643,510 | A | * | 2/1972 | Lissau | 73/708 |
| 3,715,062 | A | * | 2/1973 | Todd et al. | 222/340 |
| 3,912,419 | A | * | 10/1975 | Lutz et al. | 417/252 |
| 4,060,178 | A | * | 11/1977 | Miller | 222/14 |
| 4,343,188 | A | * | 8/1982 | Baker | 73/706 |
| 4,790,522 | A | * | 12/1988 | Drutchas | 267/225 |
| 4,880,147 | A | * | 11/1989 | Tolan | 222/195 |
| 5,094,407 | A | * | 3/1992 | Jampy et al. | 244/104 FP |
| 5,129,373 | A | * | 7/1992 | Cuatt et al. | 123/90.55 |
| 5,890,577 | A | * | 4/1999 | Faisant | 193/35 A |
| 5,902,362 | A | * | 5/1999 | Paoluccio | 55/418 |
| 6,012,491 | A | * | 1/2000 | Mohr et al. | 138/30 |
| 6,076,558 | A | * | 6/2000 | Mohr et al. | 303/115.4 |
| 6,209,583 | B1 | * | 4/2001 | Mohr et al. | 138/30 |
| 6,412,476 | B1 | * | 7/2002 | Thompson et al. | 123/516 |
| 6,527,012 | B1 | * | 3/2003 | Weber | 138/31 |

* cited by examiner

*Primary Examiner*—Patrick Brinson
(74) *Attorney, Agent, or Firm*—Eric Fincham

(57) ABSTRACT

A hydraulic fluid reservoir (10, 10', 10", 10'") comprises a body 12, 12', 12" 12'") defining a variable volume chamber having one end portion movable with the level of fluid in the chamber. A biasing member (18, 18', 18", 18'") acting on a traction rod (16, 16', 16", 16'") extending from the movable end portion restrains movement thereof under fluid pressure. The fluid pressure in the variable volume chamber advantageously counterbalances the force of reaction in the biasing member (18, 18', 18", 18'").

22 Claims, 4 Drawing Sheets

VARIABLE VOLUME RESERVOIR

The present application is a continuation-in-part of application Ser. No. 10/053,661 filed Jan. 24, 2002, now U.S. Pat. No. 6,772,794.

FIELD OF THE INVENTION

The present invention relates generally to the field of hydraulic circuits and, more particularly, to a variable volume reservoir

BACKGROUND OF THE INVENTION

Hydraulic circuits typically include a hydraulic reservoir of fixed volume, a pump for circulating the hydraulic fluid within a specific circuit, a filter and a cooler. The volume of the hydraulic reservoir is typically defined in accordance with the pumping rate of the pump. In general, the capacity of the reservoir is two to three times greater than the pumping rate of the pump and sometimes even more. This results in bulky reservoirs. Furthermore, the presence of air in hydraulic fluid is often problematic. For instance, the air may contaminate and oxidize the hydraulic fluid, cause pump cavitation problems, and may represent a risk of fire hazard.

Accordingly, efforts have been made to isolate the reserve of fluid of a hydraulic system from the atmosphere and the surrounding medium. For instance, U.S. Pat. No. 3,099,189, issued on Jul. 30, 1963 to Blondiau, discloses a fluid reservoir having a hollow body for containing a fluid and an elastic diaphragm adapted to fit within the hollow body to exert a pressure on the fluid. The bottom surface of the diaphragm follows the fluid level, according to the demand from the hydraulic circuits connected to the reservoir.

The AMSAA technical report No. 426 entitled "Hydraulic Design Guidebook Survivability And System Effectiveness" that was published by the Fluid Power Research Center Of the Oklahoma State University in August 1986 discloses a critical volume reservoir (CVR) comprising a cylindrical vessel and a piston that is axially slidable in the cylindrical vessel. The piston divides the interior space of the cylindrical vessel into first and second variable volume chambers. The first chamber is connected in fluid flow communication with a hydraulic system. The second chamber houses a compression spring acting on the piston to resist movement thereof under the pressure exerted thereon by the fluid in the first chamber. The force of reaction induced in the spring is directly transmitted from the piston to the top cover plate of the cylindrical vessel. The top cover plate must therefore be of sturdy construction. The fact that the spring is located within the cylindrical vessel also contributes to increasing the space occupied by the reservoir.

Although the variable volume reservoirs disclosed in the above-mentioned documents permits isolating the hydraulic fluid from the atmosphere, it has been found that there is still a need for a new lightweight and compact reservoir that is adapted to feed a hydraulic fluid under pressure to a hydraulic system, without inducing additional mechanical stress in the structure of the reservoir.

SUMMARY OF THE INVENTION

It is therefore an aim of the present invention to provide a minimal volume reservoir for supplying hydraulic fluid to a hydraulic system in order to meet the particular needs thereof.

It is also an aim of the present invention to isolate a hydraulic fluid from a potential source of contamination.

It is a further aim of the present invention to provide a fluid reservoir that is relatively simple and economical to manufacture.

It is a further aim of the present invention to provide a variable volume reservoir adapted to slightly pressurize a reserve of hydraulic fluid, while minimizing mechanical stress in the structure of the reservoir.

Therefore, in accordance with the present invention, there is provided a reservoir for supplying hydraulic fluid to a hydraulic system to meet the needs thereof, comprising a body defining a variable volume chamber, a port for connecting said variable volume chamber to the hydraulic system, and a restrainer urging said variable volume chamber towards a collapsed position, said restrainer being arranged so that when the variable volume chamber expands under the fluid pressure of the hydraulic fluid against a biasing force of the restrainer, a force of reaction in the restrainer equal and opposite to the biasing force is transmitted to an outer surface of the body in a direction opposite to the fluid pressure exerted by the hydraulic fluid on an inner surface of the body opposite said inner surface, thereby allowing the force of reaction in the restrainer to be counterbalanced by the fluid pressure in the variable volume chamber.

In accordance with a further general aspect of the present invention, there is provided a reservoir for use in a hydraulic circuit, comprising a body defining a variable volume chamber, a port for operatively connecting the variable volume chamber to the hydraulic circuit, said variable volume chamber having a part movable with the level of fluid in said chamber, a device opposing movement of said part under fluid pressure, said device including a traction rod connected to said part, and a biasing member acting on said traction rod to urge said part towards a collapsed position.

In accordance with a further general aspect of the present invention, there is provided a variable-volume reservoir for supplying fluid to a hydraulic system, comprising a casing and a movable reservoir head defining with the casing a variable-volume chamber having a fluid port adapted to be connected in fluid flow communication with the hydraulic system, a spring biasing said reservoir head towards a collapsed position wherein the volume of the variable-volume chamber is minimal, and a guide extending axially along a major portion of the length of the spring to prevent said spring from buckling.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
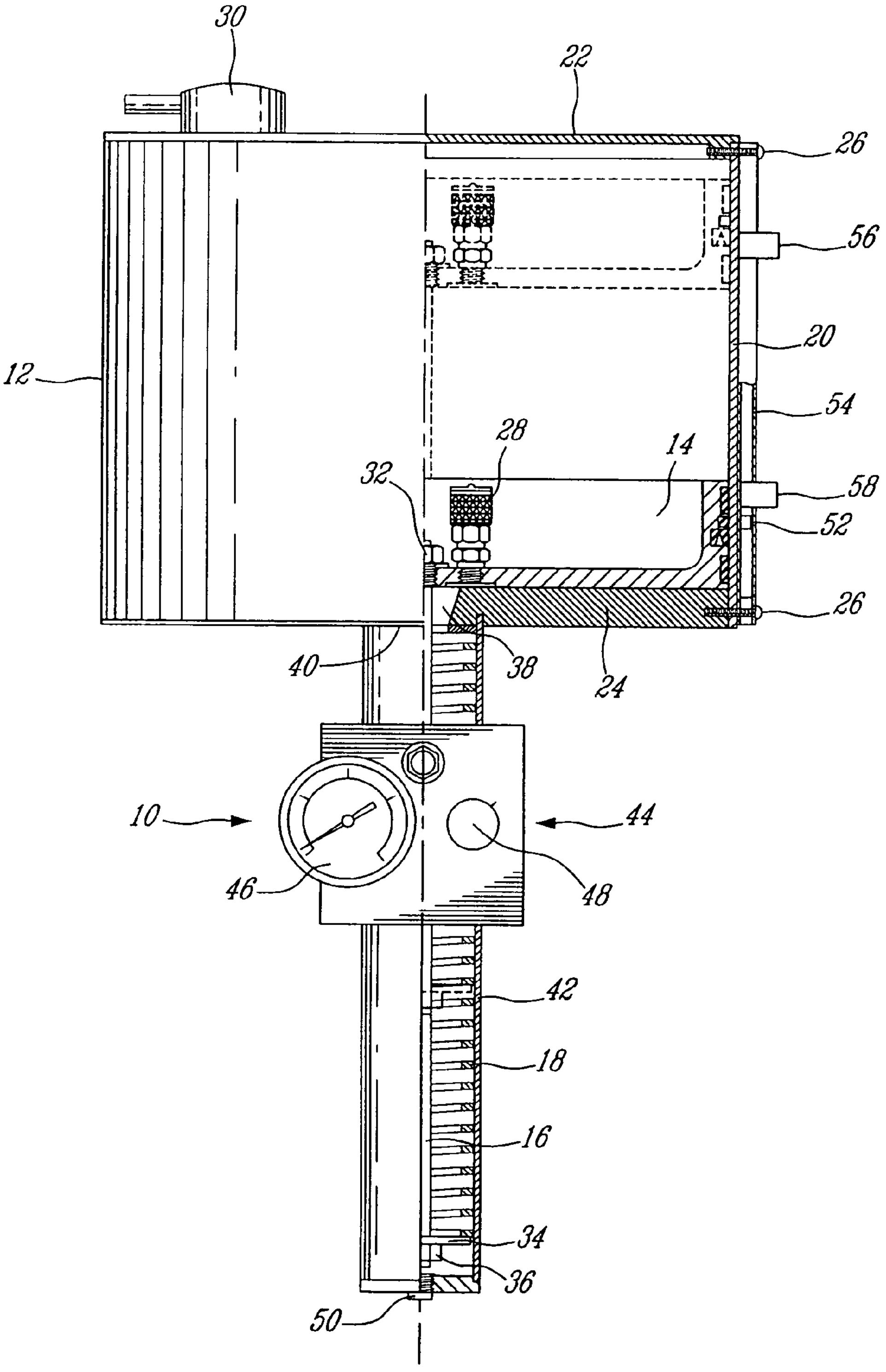
FIG. 1 is an elevation view, partly in section, of a variable volume reservoir, in accordance with a first embodiment of the present invention.

FIG. 1 illustrates a variable volume reservoir 10 suited for supplying hydraulic fluid, such as oil, to mobile or stationary hydraulic systems where hauling excessive quantities of fluid is uneconomical, cumbersome or only poor in design. As will be seen hereinafter, one further advantage of using a variable volume reservoir is that the volume of the reservoir varies directly with the variation in fluid level of the reservoir, thereby preventing air from being trapped in the reservoir over the reserve of hydraulic fluid. This permits isolating the reserve of fluid from air, thereby avoiding potential particulate and chemical contamination of the fluid. The absence of air in the reservoir also reduces the risk of fire.

The variable volume reservoir 10 is designed to contain only the minimal volume of fluid required to meet the particular requirements of a specific hydraulic system.

The variable volume reservoir 10 is of compact construction and generally comprises a closed cylindrical body 12, a movable reservoir head, such as a piston 14 that is axially slidable in the cylindrical body 12, a traction rod 16 extending from the piston 14 outwardly of the cylindrical body 12, and a compression spring 18 acting on the traction rod 16 to bias the piston 14 towards a collapsed position, as illustrated in full lines in FIG. 1.

The cylindrical body 12 includes a cylindrical sidewall 20 closed at an upper end thereof by a top cover plate 22 and at a bottom end thereof by a bottom cover plate 24. The piston 14, the surrounding sidewall 20 and the bottom cover plate 24 define a variable volume chamber for the hydraulic fluid. According to a preferred embodiment of the present invention, the top and bottom cover plates 22 and 24 are removably fastened to the cylindrical sidewall 20 by means of a number of threaded fasteners 26.

An air bleed valve 28 is provided on the piston 14 for allowing air contained in the hydraulic fluid to flow from the variable volume chamber to the opposite side of the piston 14. The air collected in the space between the piston 14 and the top cover plate 22 is vented to the atmosphere through an air filter/breather 30 provided on the top cover plate 22.

The traction rod 16 has an upper threaded end threadably engaged with a nut 32 in order to structurally connect the rod 16 to the piston 14. An annular stop 34 is mounted about the rod 16 and maintained thereat by a nut 36 threadably engaged with a lower threaded end of the rod 16. The rod 16 extends outwardly of the cylindrical body 12 through a central passage 38 defined in the bottom cover plate 24.

The spring 18 is mounted about the traction rod 16 and has a first end abutted against an undersurface 40 of the bottom cover plate 24 about the central passage 38 and a second end abutted against the stop 34. The spring 18 acts as a restrainer by exerting a biasing force on the stop 34 and, thus, the rod 16, in a direction normal and away from the piston 14. The corresponding force of reaction in the spring 18, which is equal but opposite to the biasing force, is transmitted to the bottom cover plate 24. This arrangement is advantageous in that the force of reaction is in opposition to the pressure exerted by the hydraulic fluid on the inner surface of the bottom cover plate 24. The fluid pressure thus, counterbalances the force of reaction. In this way, no additional stress is induced by the spring 18 in the structure forming the cylindrical body 12. Accordingly, thinner and less sturdy parts can be used in the construction of the cylindrical body 12.

The spring 18 is received in a tubular guide 42 depending centrally downwardly from the bottom cover plate 24. The tubular guide 42 prevents the spring 18 from buckling. Consequently, the small fluid volume contained inside the tubular guide will minimize the thermal fluid contraction-expansion effects. A port and instrumentation block 44 is provided on the tubular guide 42. The port and instrumentation block 42 may comprise a pressure gauge 46, a temperature switch or sensor 48, a fluid pre-fill dry disconnect fitting and inlet and outlet ports (not shown) adapted to be respectively connected in fluid flow communication with the return and distribution lines of a hydraulic fluid circuit (not shown). The hydraulic fluid flowing in the return line of the circuit is first received in the tubular guide 42 through the inlet port defined therein. When the tubular guide 42 is full of fluid and the spring 18 completely submerged in the hydraulic fluid, the piston 14 is urged by the fluid to a position away from the bottom cover plate 24 (as illustrated in broken lines in FIG. 1) against the biasing force of the spring 18. The spring 18 is advantageously protected against oxidation by the hydraulic fluid. The piston 14 moves with the level of fluid in the cylindrical body 12, while maintaining the hydraulic fluid under pressure, thereby allowing supplying pressurized hydraulic fluid to a pump operatively connected to the distribution line of the hydraulic circuit. This helps in preventing pump cavitations.

As shown in FIG. 1, a drain plug 50 is threadably engaged in a hole defined in the base of the tubular guide 42.

The level of fluid in the cylindrical body 12 may be ascertained by visual inspection of a fluid level indicating magnet 52 that is axially slidable in a transparent tube 54 provided on an outer surface of the sidewall 20. The piston 14 is, at least partly, made of a magnetic material to ensure conjoint movement of the magnet 52 and the piston 14.

High and low level switches 56 and 58 can be mounted on the cylindrical body 12 to send a control signal to a control system of the hydraulic system.

Figure 2:
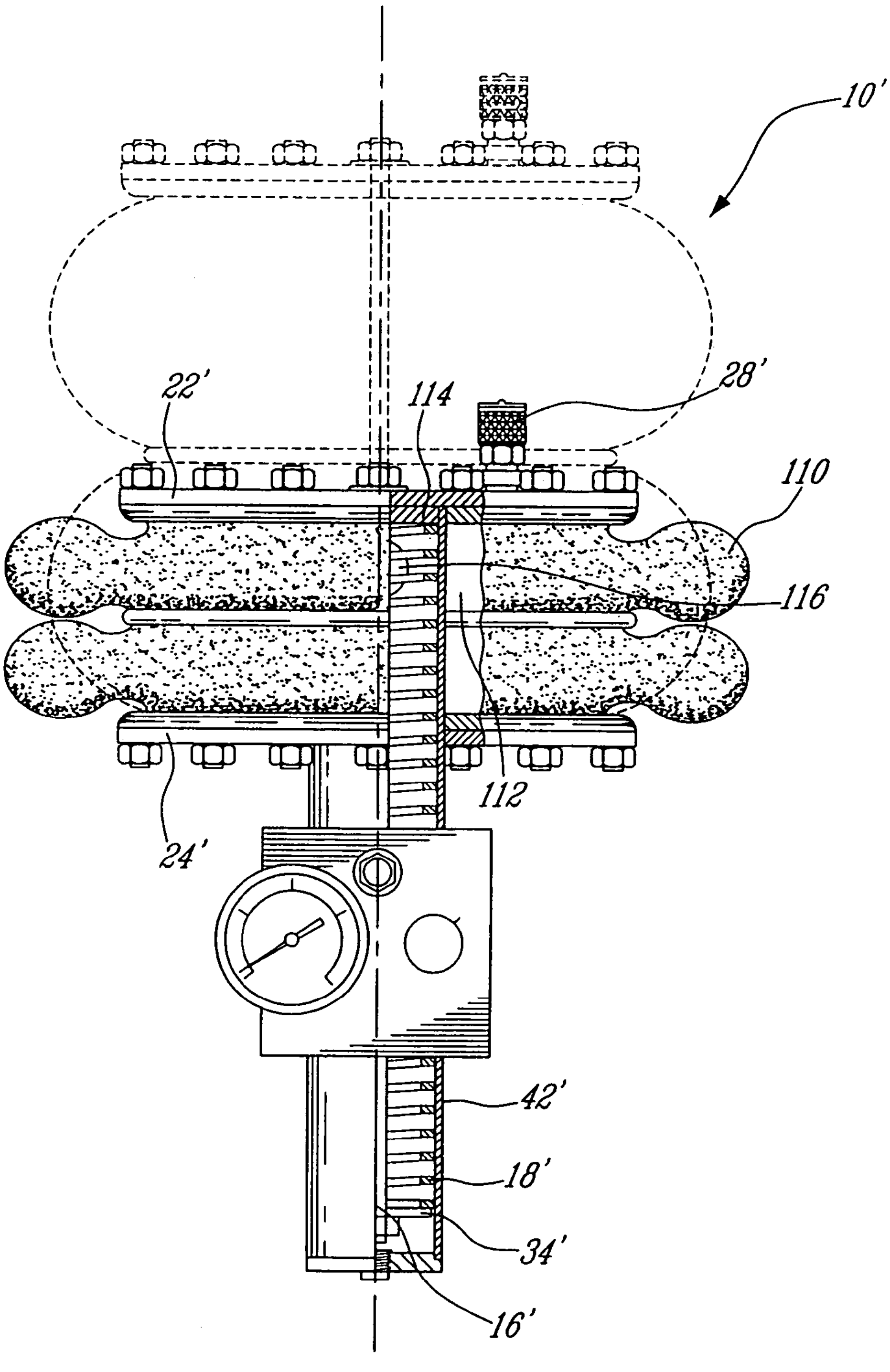
FIG. 2 is an elevation view, partly in section, of a variable volume reservoir, in accordance with a second embodiment of the present invention

In the following description that pertains to the reservoir of FIG. 2, components that are identical in function and identical or similar in structure to corresponding components of the reservoir of FIG. 1 bear the same reference numeral as in FIG. 1, but are tagged with the suffix "'", whereas components that are new to the reservoir of FIG. 2 are identified by new reference numerals in the hundreds.

The second embodiment essentially differs from the first embodiment in that the cylindrical body 12' is provided in the form of a pair of end plates 22' and 24' flexibly connected to each other by a bellows 110. The bellows 110 is made of a flexible impermeable material that is chemically inert to the hydraulic fluid. The end plates 22' and 24' and the bellows 110 define a variable volume chamber 112 for the hydraulic fluid. As illustrated in FIG. 2, the top end plate 22' acts as a movable reservoir head which moves with the level of fluid in the variable volume chamber 112 against the biasing force of the compression spring 18'. The compression spring 18' extends between a stop 114 extending inwardly from an upper end of the tubular guide 42' and the stop 34' provided at the lower end of the traction rod 16'. A hole 116 is defined in the upper end of the tubular guide 42' for allowing the hydraulic fluid to pass from the tubular guide 42' into the variable volume chamber 112.

The air bleed valve 28' is mounted on the top end plate 22' for venting air contained in the hydraulic fluid to the atmosphere.

Figure 3:
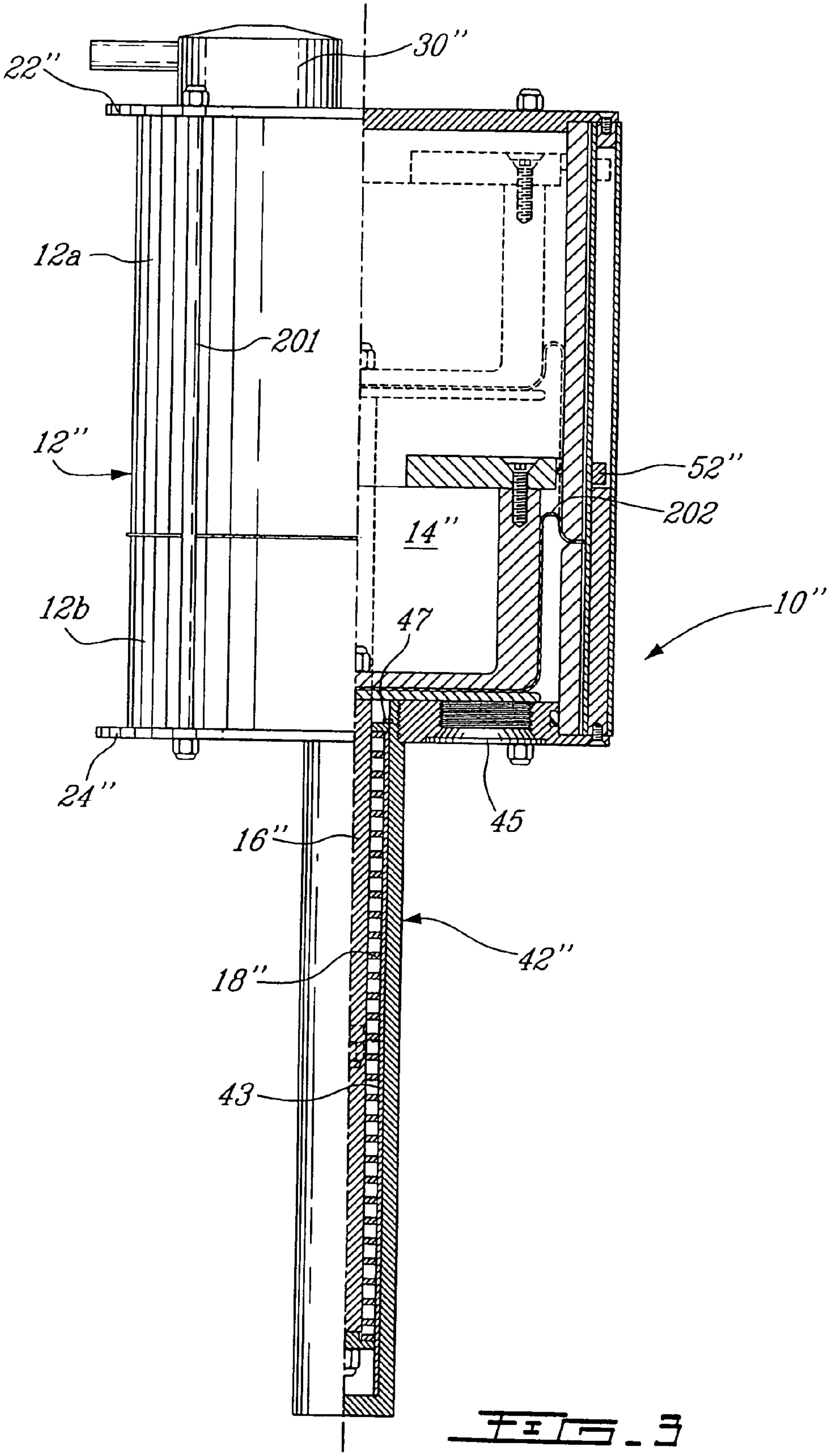
FIG. 3 is an elevation view, partly in section, of a variable volume reservoir, in accordance with a third embodiment of the present invention.

FIG. 3 illustrates a third embodiment of the present which essentially differs from the first embodiment in that the cylindrical body 12" is provided in the form of a two-piece body comprising an upper tube 12*a* and a lower tube 12*b* assembled in an end-to-end relationship by means of a plurality of circumferentially distributed tie rods 201 extending between the top and the bottom cover plates 22" and 24". A diaphragm 202 provided in the form of a stretchable impermeable membrane is mounted to the piston 14" and is retained captive at its periphery between the upper and lower tubes 12*a* and 12*b*. The addition of the diaphragm contributes to improve the seal between and the piston 14" and the inner wall of the cylindrical body 12".

The third embodiment also differs from the first on in that the inlet port 45 of the reservoir 10" is provided in the bottom end plate 24".

Furthermore, the size of the traction rod 16" has been increased to allow the same to act as an inner guide for the spring 18". The tubular guide 42" is this time threadably engaged at its upper end to the bottom end plate 24" and houses a removable outer spring guide tube 43. The spring 18" is engaged at its upper end against an annular stop plate 47 mounted to the tubular guide 42". With this arrangement the spring 18" is advantageously fully guided inwardly and outwardly along all the length thereof.

Figure 4:
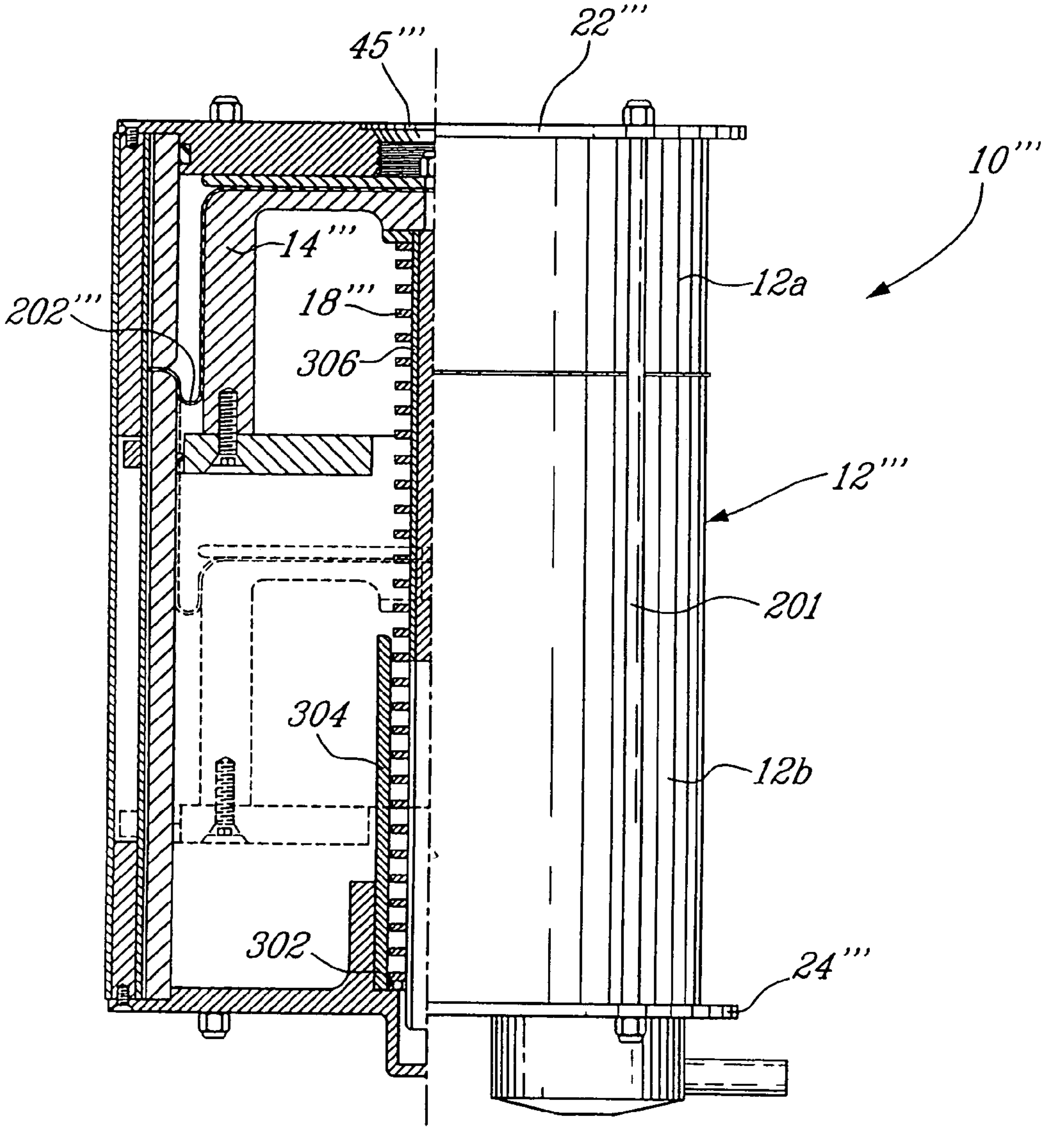
FIG. 4 is an elevation view, partly in section, of a variable volume reservoir, in accordance with a fourth embodiment of the present invention.

FIG. 4 shows a fourth embodiment of the present invention which essentially differs from the third embodiment in that the spring 18'" is installed within the cylindrical body 12'". To this end, a seat 302 is provided on an inner surface of the bottom end plate 24'" for receiving one end portion of an axially extending outer guide tube 304. The spring is guided inwardly by an axial inner guide shaft 306 extending downwardly from the piston 14'". The shaft 306 and the outer guide tube 304 slightly overlap so that the spring is guided over all the length thereof at all time. Typically, the length of the shaft 306 and the outer guide tube 304 will be about half that of the spring 18'".

The inlet port 45'" is provided in the top cover plate 22'".

While the invention has been described by reference to preferred embodiments, it should be understood that numerous changes could be made within the spirit and scope of the inventive concepts described. For instance, an extension spring could be used in lieu of a compression spring as described bereinbefore. Furthermore, other types of biasing members could be used to urge the variable volume chamber towards a collapsed position. It is also understood that the reservoirs illustrated in FIGS. 1 to 4 can be used in any desired orientation.

I claim:

1. A variable volume reservoir for supplying fluid to a hydraulic system, comprising a casing and a movable reservoir head defining with the casing a variable volume chamber having a fluid port adapted to be connected in fluid flow communication with the hydraulic system, said movable reservoir head being a piston slidable mounted in said casing, a spring biasing said reservoir head towards a collapsed position wherein the volume of the variable volume chamber is minimal, and a guide extending axially along a major portion of the length of the spring to prevent said spring from buckling, said guide including an axially extending tube and an axially extending inner guide, said spring being received in said axially extending tube and extending about said axially extending inner guide.

2. A variable volume reservoir as defined in claim 1, wherein said tube is connected in fluid flow communication with said variable volume chamber.

3. A variable volume reservoir as defined in claim 2, wherein said axially extending inner guide is a traction rod extending from said movable reservoir head.

4. A variable volume reservoir as defined in claim 3, wherein said casing includes first and second tubular sections axially assembled in a end-to-end relationship, and wherein a membrane is provided on said piston, said membrane being received at a peripheral portion thereof between said first and second tubular sections.

5. A reservoir for supplying hydraulic fluid to a hydraulic system to meet the needs thereof, comprising a body defining a variable volume chamber, a port for connecting said variable volume chamber to the hydraulic system, and a restrainer urging said variable volume chamber towards a collapsed position, said restrainer being arranged such that, when the variable volume chamber expands under the fluid pressure of the hydraulic fluid against a biasing force of the restrainer, a force of reaction in the restrainer equal and opposite to the biasing force is transmitted to an outer surface of the body in a direction opposite to the fluid pressure exerted by the hydraulic fluid on an inner surface of the body opposite said inner surface, thereby allowing the force of reaction in the restrainer to be counterbalanced by the fluid pressure in the variable volume chamber.

6. A reservoir as defined in claim 5, wherein said variable volume chamber includes a movable part, wherein said restrainer includes a biasing member, and a fraction rod extending from said movable part in a direction opposite to an expansion direction of said variable volume chamber, and wherein the biasing force of the biasing member is transmitted to the movable part by said fraction rod.

7. A reservoir as defined in claim 6, wherein said biasing member is received in a tubular guide to prevent said biasing member from buckling.

8. A reservoir as defined in claim 7, wherein said tubular guide is in fluid flow communication with said variable volume chamber so that said biasing member be immersed in the hydraulic fluid.

9. A reservoir as defined in claim 8, wherein said part is provided in said tubular guide.

10. A reservoir as defined in claim 6, wherein said biasing member includes a spring mounted about said traction rod, said spring having a first end abutted against said outer surface of said body and a second end abutted against a stop provided at a free end portion of said traction rod opposite said movable part of said variable volume chamber, said spring pushing on said stop to urge said movable part to said collapsed position.

11. A reservoir as defined in claim 6, wherein said body includes a cylindrical housing, and wherein said movable part includes a piston axially slidable in said cylindrical housing so as to divide an interior volume of said cylindrical housing into first and second chambers, said port being connected in fluid flow communication with said second chamber, said traction rod extending outwardly of said second chamber through an end plate of said cylindrical housing, said biasing member having a first end thereof abutted against an outer surface of said end plate and a second opposed end thereof abutted against a stop provided at a free end of said traction rod.

12. A reservoir as defined in claim 11, wherein an air bleed valve is provided on said piston to allow air to flow from said second chamber to said first chamber.

13. A reservoir as defined in claim 5, wherein said variable volume chamber is defined by first and second end plates connected together by a bellows.

14. A reservoir as defined in claim 13, wherein said restrainer includes a biasing member and a rod extending from said first end plate, said biasing member acting on said rod to bias said first end plate towards said second end plate.

15. A reservoir as defined in claim 14, wherein an air bleed valve is provided on said first end plate.

16. A reservoir as defined in claim 14, wherein said biasing member is received in a tubular guide connected in fluid flow communication with an interior space defined by said first and second end plates and said bellows.

17. A reservoir as defined in claim 16, wherein said biasing member is a spring mounted about said rod, and wherein said tubular guide is fixed relative to said second end plate.

18. A reservoir as defined in claim 11, wherein a level indicating magnet is provided outwardly of said body for joint movement with said piston in order to provide an indication of the level of hydraulic fluid in the variable volume chamber.

19. A reservoir for use in a hydraulic circuit, comprising a body defining a variable volume chamber, a port for operatively connecting the variable volume chamber to the hydraulic circuit, said variable volume chamber having a port movable with the level of fluid in said chamber, a device opposing movement of said part under fluid pressure, said device including a traction rod connected to said part, and a biasing member acting on said fraction rod to urge said part towards a collapsed position, said biasing member being tightly fitted in a tubular member, said biasing member including a spring having a first end abutted against an outer surface of the body and a second end abutted against a stop provided at a free distal end of said traction rod so that a force of reaction in said spring is balanced by the fluid pressure on an inner surface of the body opposite a point of contact of said spring with said outer surface of said body.

20. A reservoir as defined in claim 19, wherein said tubular member is in fluid flow communication with said variable volume chamber.

21. A reservoir as defined in claim 20, wherein said port is defined in said tubular member so tat said biasing member be immersed in the hydraulic fluid.

22. A reservoir as defined in claim 19, wherein said body includes first and second end plates connected by a bellows, and wherein said traction rod extends from said first end plate outwardly of said variable volume chamber trough said second end plate.

* * * * *